United States Patent
Cao et al.

(10) Patent No.: US 12,352,321 B2
(45) Date of Patent: Jul. 8, 2025

(54) BIDIRECTIONAL ELECTROMAGNETIC CLUTCH AND GEAR SHIFTING DEVICE

(71) Applicant: Jing-Jin Electric Technologies Co., Ltd., Beijing (CN)

(72) Inventors: Yang Cao, Beijing (CN); Ping Yu, Beijing (CN); Jianwen Li, Beijing (CN); Pengyuan Zhou, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 0 days.

(21) Appl. No.: 18/628,105

(22) Filed: Apr. 5, 2024

(65) Prior Publication Data
US 2025/0163976 A1 May 22, 2025

(30) Foreign Application Priority Data

Nov. 16, 2023 (CN) ......................... 202311527575.4

(51) Int. Cl.
*F16D 27/118* (2006.01)

(52) U.S. Cl.
CPC ................... *F16D 27/118* (2013.01)

(58) Field of Classification Search
CPC ............................... F16D 27/118; F16D 27/12
See application file for complete search history.

(56) References Cited

U.S. PATENT DOCUMENTS

| | | | |
|---|---|---|---|
| 2002/0130008 A1 | 9/2002 | Tomari et al. | |
| 2010/0133059 A1* | 6/2010 | Winkler | F16D 27/12 192/84.21 |
| 2015/0075935 A1* | 3/2015 | Kitayama | F16D 41/105 192/45.004 |
| 2016/0138712 A1* | 5/2016 | Nyquist | F16D 27/04 192/48.2 |
| 2018/0187727 A1* | 7/2018 | Hornbrook | F16H 3/006 |
| 2020/0240479 A1* | 7/2020 | Liu | F16D 41/12 |
| 2021/0155219 A1* | 5/2021 | Alcantar | B60W 10/08 |
| 2023/0417310 A1* | 12/2023 | Verhoog | F16D 11/14 |

FOREIGN PATENT DOCUMENTS

| | | |
|---|---|---|
| CN | 108716513 A | 10/2018 |
| FR | 0827127 A | 4/1938 |

OTHER PUBLICATIONS

European Search Report received for European Patent Application No. 24166553.8, mailed on Oct. 15, 2024, 5 pages.

* cited by examiner

*Primary Examiner* — Farhana Pervin
(74) *Attorney, Agent, or Firm* — ARENTFOX SCHIFF LLP

(57) ABSTRACT

A bidirectional electromagnetic clutch is provided that includes first and second electromagnetic clutches arranged along positive and negative directions of the same axis. The two electromagnetic clutches are integrated in the same space and configured to independently engage and/or disengage at different ends of the bidirectional electromagnetic clutch. The working states of the bidirectional electromagnetic clutch include: the first electromagnetic clutch is engaged, and the second electromagnetic clutch is engaged; the first electromagnetic clutch is engaged, and the second electromagnetic clutch is disengaged; the first electromagnetic clutch is disengaged, and the second electromagnetic clutch is engaged; the first electromagnetic clutch is disengaged, and the second electromagnetic clutch is disengaged.

11 Claims, 4 Drawing Sheets

BIDIRECTIONAL ELECTROMAGNETIC CLUTCH AND GEAR SHIFTING DEVICE

CROSS REFERENCE TO RELATED APPLICATION

This application claims priority to Chinese patent application No. 202311527575.4 filed on Nov. 16, 2023, the disclosure of which is hereby incorporated by reference in its entirety.

TECHNICAL FIELD

The present disclosure relates to the technical field of clutches, in particular to a bidirectional electromagnetic clutch and a gear shifting device.

BACKGROUND

New energy vehicles will face different working states during the working process, including but not limited to smooth driving, acceleration and shifting, deceleration, parking, etc., which involve the mechanism transformation of the power system. The electromagnetic clutch is a preferable choice to achieve this function. With the continuous development of the automotive industry, electromagnetic clutches have been more and more widely used in new energy vehicles. The electromagnetic clutch controls the engagement and disengagement of the clutch by energizing and de-energizing the coil.

The inventors found that the prior art has at least the following problems. Conventional electromagnetic clutches can only transmit torque in one direction. In new energy vehicles, if torque needs to be transmitted in both directions, two electromagnetic clutches are needed. Therefore, conventional electromagnetic clutches have the disadvantages of not being compact enough, occupying a larger space, and limited space layout, which to some extent affects the spatial configuration of various components in the power system of new energy vehicles.

SUMMARY

The present disclosure aims to solve at least one of the technical problems in the prior art to some extent.

Therefore, an object of the present disclosure is to provide a bidirectional electromagnetic clutch and a gear shifting device to solve the problems of conventional electromagnetic clutches that the structure is not compact enough and occupies a larger space, and the space layout is limited.

To achieve the above object, a first aspect of the present disclosure provides a bidirectional electromagnetic clutch, which comprises a first electromagnetic clutch and a second electromagnetic clutch arranged along positive and negative directions of a same axis, the two electromagnetic clutches are integrated in a same space and configured to independently engage and/or disengage at different ends of the bidirectional electromagnetic clutch; the bidirectional electromagnetic clutch has four working states, namely, the first electromagnetic clutch is engaged, and the second electromagnetic clutch is engaged; the first electromagnetic clutch is engaged, and the second electromagnetic clutch is disengaged; the first electromagnetic clutch is disengaged, and the second electromagnetic clutch is engaged; the first electromagnetic clutch is disengaged, and the second electromagnetic clutch is disengaged.

In the bidirectional electromagnetic clutch according to the present disclosure, by integrating the first electromagnetic clutch and the second electromagnetic clutch arranged along the positive and negative directions of the same axis in the same space, the functions of two electromagnetic clutches can be completed by the space of one electromagnetic clutch. Therefore, the structure is compact and occupies less space, and flexible space layout can be made according to different applications and structural spaces.

According to an embodiment of the present disclosure, the first electromagnetic clutch comprises a first electromagnetic movable unit and a first electromagnetic fixed unit, the second electromagnetic clutch comprises a second electromagnetic movable unit and a second electromagnetic fixed unit, the first electromagnetic fixed unit and the second electromagnetic fixed unit are arranged along a circumference of the bidirectional electromagnetic clutch, and the first electromagnetic movable unit and the second electromagnetic movable unit are arranged to face to each other with a partition layer formed therebetween, and the first electromagnetic fixed unit and the second electromagnetic fixed unit are arranged in a staggered manner within the partition layer.

According to an embodiment of the present disclosure, the first electromagnetic clutch is a monostable or bistable electromagnetic clutch, and the second electromagnetic clutch is a monostable or bistable electromagnetic clutch.

According to an embodiment of the present disclosure, there are several guide holes provided on the first electromagnetic movable unit and the second electromagnetic movable unit, there are several connecting pins provided between the first electromagnetic movable unit and the second electromagnetic movable unit, and the guide holes and the connecting pins form axial relative movement.

According to an embodiment of the present disclosure, the first electromagnetic fixed unit comprises a first coil unit, a first elastic member, and a first position-limiting unit; the second electromagnetic fixed unit comprises a second coil unit, a second elastic member, and a second position-limiting unit; the first coil unit and the second coil unit are separated by the connecting pins, the first elastic member is connected to the first electromagnetic movable unit, the second elastic member is connected to the second electromagnetic movable unit, the first position-limiting unit is used to limit a position of the first electromagnetic movable unit, and the second position-limiting unit is used to limit a position of the second electromagnetic movable unit.

According to an embodiment of the present disclosure, the first coil unit comprises a first coil, a first iron core, and a first magnetic yoke, one end of the first iron core is fixedly connected to the first magnetic yoke, and the first coil is sleeved on the first iron core; the second coil unit comprises a second coil, a second iron core, and a second magnetic yoke, one end of the second iron core is fixedly connected to the second magnetic yoke, and the second coil is sleeved onto the second iron core.

According to an embodiment of the present disclosure, means of fixed connection between the first iron core and the first magnetic yoke include: the first iron core and the first magnetic yoke are connected by an interference fit, or connected through a screw, or connected through a snap spring;

means of fixed connection between one end of the second iron core and the second magnetic yoke include: the second iron core and the second magnetic yoke are connected by an interference fit, or connected through a screw, or connected through a snap spring.

According to an embodiment of the present disclosure, when the first and second electromagnetic clutches are monostable clutches, the first or second electromagnetic clutch is energized for engagement and de-energized for disengagement; the first electromagnetic movable unit comprises a first movable disc, the first movable disc has a first sinking hole corresponding to a position of the first iron core, and there is an air gap between the first sinking hole and an end face of the first iron core; the second electromagnetic movable unit comprises a second movable disc, the second movable disc has a second sinking hole corresponding to a position of the second iron core, and there is an air gap between the second sinking hole and an end face of the second iron core.

According to an embodiment of the present disclosure, when the first and second electromagnetic clutches are bistable clutches, the first or second electromagnetic clutch is applied with a pulse current for engagement or disengagement, and during the engagement or disengagement state it does not need to be energized or consume any form of energy; the first electromagnetic movable unit further comprises a first magnetic conduction disc and a first magnet, the first magnet is installed in the first sinking hole, and the first magnetic conduction disc is installed on an end face of the first movable disc and in contact with the first magnet; the second electromagnetic movable unit further comprises a second magnetic conduction disc and a second magnet, the second magnet is installed in the second sinking hole, and the second magnetic conduction disc is installed on the end face of the second movable disc and in contact with the second magnet.

According to an embodiment of the present disclosure, the first position-limiting unit comprises a first position-limiting block and a first position-limiting plate, the first position-limiting block is installed on the first magnetic yoke and connected to the first elastic member, and is used to limit the position of the first electromagnetic movable unit when it engages; the first position-limiting plate is installed on the outer side of the first movable disc and fixed to the connecting pins, and is used to limit the position of the first electromagnetic movable unit when it disengages; the second position-limiting block is installed on the second magnetic yoke and connected to the second elastic member, and is used to limit the position of the second electromagnetic movable unit when it engages; the second position-limiting plate is installed on the outer side of the second movable disc and fixed to the connecting pins, and is used to limit the position of the second electromagnetic movable unit when it disengages.

According to an embodiment of the present disclosure, the bidirectional electromagnetic clutch further comprises an displacement prevention plate, two ends of the displacement prevention plate are respectively provided on an outer side of the first movable disc and an outer side of the second movable disc, a distance between two ends of the displacement prevention plate is less than a distance from the first position-limiting plate to the second position-limiting plate, and the displacement prevention plate is used to prevent movement of the first movable disc and/or the second movable disc from exceeding a preset distance.

According to an embodiment of the present disclosure, the bidirectional electromagnetic clutch further comprises a position sensor for monitoring position status of the bidirectional electromagnetic clutch, and the position sensor is an inductive position sensor or a Hall position sensor.

A second aspect of the present disclosure provides a gear shifting device comprising a mechanical unit and the bidirectional electromagnetic clutch as described in the first aspect, the mechanical unit is coupled with the bidirectional electromagnetic clutch, the bidirectional electromagnetic clutch is used to perform clutch and locking, and the mechanical unit is used to transmit mechanical energy.

The additional aspects and advantages of the present disclosure will be partially provided in the following description, some of which will become apparent from the following description, or will be understood through the practice of the present disclosure.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
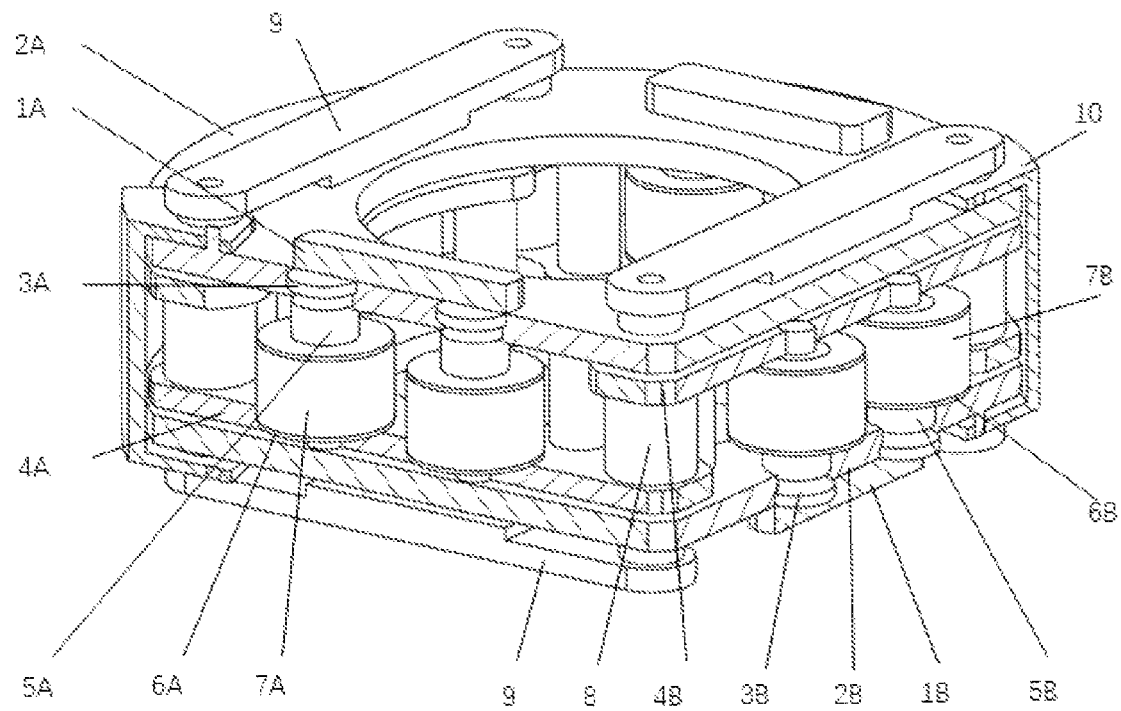
FIG. 1 is a schematic diagram of the structure of a bidirectional electromagnetic clutch with two intersecting cross-sections according to an embodiment of the present disclosure.

In the drawings: 1A, first magnetic conduction disc; 1B, second magnetic conduction disc; 2A, first movable disc; 2B, second movable disc; 2C, partition layer; 2D, guide hole; 2E, first sinking hole; 2F, second sinking hole; 2G, air gap; 3A, first magnet; 3B, second magnet; 4A, first yoke; 4B, second yoke; 5A, first iron core; 5B, second iron core; 6A, first skeleton; 6B, second skeleton; 7A, first coil; 7B, second coil; 8, connecting pin; 9, position-limiting plate; 10, displacement prevention plate; 11, position-limiting block; 12, elastic member; 101, bidirectional electromagnetic clutch; 102A, first movable end face teeth; 102B, second movable end face teeth; 103A, first deep groove ball bearing; 103B, second deep groove ball bearing; 104A, first driving gear; 104B, second driving gear; 13, position sensor.

DETAILED DESCRIPTION

A detailed description of embodiments of the present disclosure is provided below. Examples of the embodiments are shown in the accompanying drawings, throughout which identical or similar reference numerals represent identical or similar components or components with identical or similar functions. The embodiments described below with reference to the accompanying drawings are illustrative and intended only to explain the present disclosure, and cannot be understood as limitations to the present disclosure. On the contrary, the embodiments of the present disclosure include all changes, modifications, and equivalents that fall within the scope of the spirit and content of the attached claims.

Figure 2:
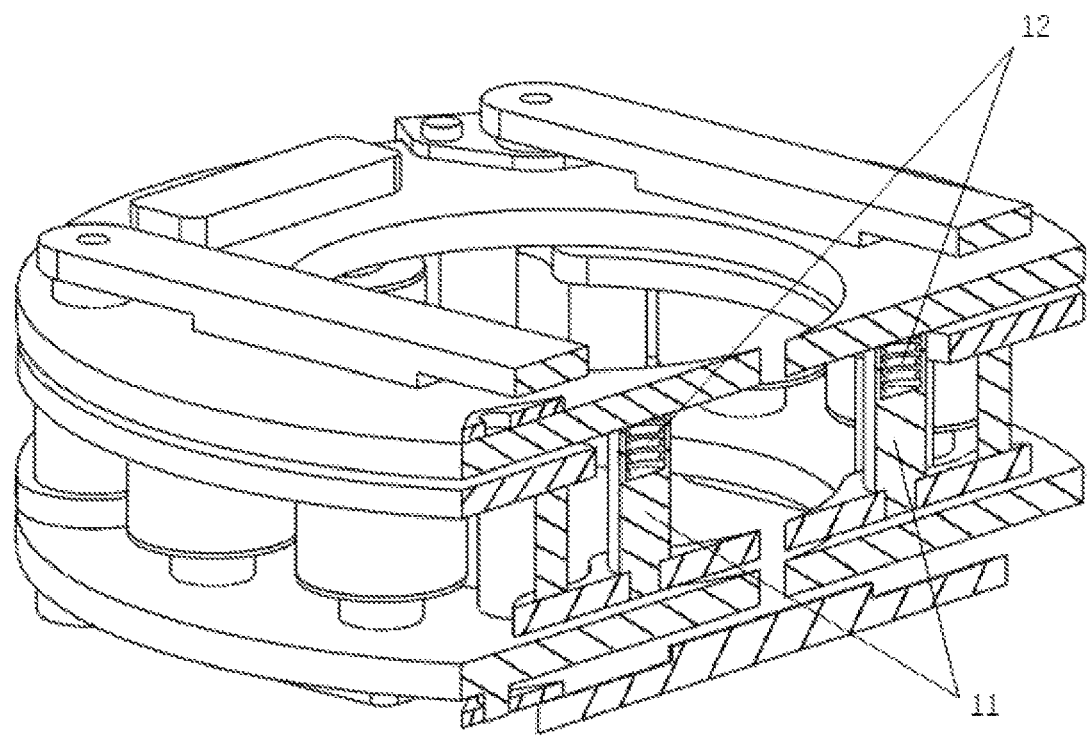
FIG. 2 is a schematic diagram of the structure of a bidirectional electromagnetic clutch with a cross-section according to an embodiment of the present disclosure.

FIG. 1 is a schematic diagram of the structure of a bidirectional electromagnetic clutch with two intersecting cross-sections according to an embodiment of the present disclosure. FIG. 2 is a schematic diagram of the structure of a bidirectional electromagnetic clutch with a cross-section according to an embodiment of the present disclosure.

Referring to FIG. 1, a first aspect of the present disclosure provides a bidirectional electromagnetic clutch 101. The bidirectional electromagnetic clutch comprises a first electromagnetic clutch and a second electromagnetic clutch arranged along positive and negative directions of the same axis. The two electromagnetic clutches are integrated in a same space and configured to independently engage and/or disengage at different ends of the bidirectional electromagnetic clutch.

The first electromagnetic clutch and the second electromagnetic clutch are integrated in the same space, and the space they occupy is the same as the space occupied by one electromagnetic clutch in the prior art. The first electromagnetic clutch and the second electromagnetic clutch form an assembly. The first electromagnetic clutch and the second electromagnetic clutch can work independently without interfering with each other, and can independently achieve engagement and disengagement actions on two sides of the bidirectional electromagnetic clutch. There are a total of four working states: the first electromagnetic clutch is engaged, and the second electromagnetic clutch is engaged; the first electromagnetic clutch is engaged, and the second electromagnetic clutch is disengaged; the first electromagnetic clutch is disengaged, and the second electromagnetic clutch is engaged; the first electromagnetic clutch is disengaged, and the second electromagnetic clutch is disengaged. It is possible to have 4 or 3 of the above working states in a certain application according to specific application conditions.

In the bidirectional electromagnetic clutch according to the embodiment of the present disclosure, by integrating the first electromagnetic clutch and the second electromagnetic clutch arranged along the positive and negative directions of the same axis in the same space, the functions of two electromagnetic clutches can be completed by the space of one electromagnetic clutch. Therefore, the structure is compact and occupies less space, and flexible space layout can be made according to different applications and structural spaces.

In some embodiments, in the bidirectional electromagnetic clutch, the first electromagnetic clutch comprises a first electromagnetic movable unit and a first electromagnetic fixed unit, the second electromagnetic clutch comprises a second electromagnetic movable unit and a second electromagnetic fixed unit, the first electromagnetic fixed unit and the second electromagnetic fixed unit are arranged along the circumference of the bidirectional electromagnetic clutch, the first electromagnetic movable unit and the second electromagnetic movable unit are arranged to face to each other with a partition layer 2C formed therebetween, and the first electromagnetic fixed unit and the second electromagnetic fixed unit are arranged in a staggered manner within the partition layer 2C. Electromagnetic fixed units can generate electromagnetic force when energized. Under the action of the electromagnetic force, each electromagnetic movable unit can disengage at one side of a corresponding electromagnetic fixed unit.

There are several guide holes 2D provided on the first electromagnetic movable unit and the second electromagnetic movable unit. There are several connecting pins 8 provided between the first electromagnetic movable unit and the second electromagnetic movable unit. The guide holes 2D and the connecting pins 8 form axial relative movement.

Specifically, the first electromagnetic fixed unit comprises a first coil unit, a first elastic member, and a first position-limiting unit. The second electromagnetic fixed unit comprises a second coil unit, a second elastic member, and a second position-limiting unit. The first coil unit and the second coil unit are separated by the connecting pins 8. Within the partition formed between two adjacent connecting pins 8 the number of first coil units and second coil units can be designed according to actual needs. Optionally, the number of first coil units and second coil units is 2, and the number of connecting pins is 4.

The first elastic member is connected to the first electromagnetic movable unit, and the second elastic member is connected to the second electromagnetic movable unit. The first elastic member and the second elastic member are an elastic member 12 of the same type. The elastic member 12 may be a compression spring. Its functions are as follows. First, when the first or second electromagnetic movable unit is in a disengaged state and the first or second electromagnetic fixed unit is not energized, the elastic member 12 can keep the first or second electromagnetic movable unit in a disengaged state. Second, when the first or second electromagnetic movable unit is in an engaged state, if a backward current is applied to the first or second electromagnetic fixed unit, the elastic member 12 can cause the first or second electromagnetic movable unit to move to the disengaged state.

The first position-limiting unit is used to limit the position of the first electromagnetic movable unit, and the second position-limiting unit is used to limit the position of the second electromagnetic movable unit. The position-limiting of the position-limiting unit includes two aspects: first, the position-limiting when the electromagnetic movable unit is engaged; second, the position-limiting when the electromagnetic movable unit is disengaged.

In some embodiments, as shown in FIG. 1, the first coil unit comprises a first coil 7A, a first iron core 5A, and a first magnetic yoke 4A. One end of the first iron core 5A is fixedly connected to the first magnetic yoke 4A, and the first coil 7A is sleeved on the first iron core 5A. The second coil unit comprises a second coil 7B, a second iron core 5B, and a second magnetic yoke 4B. One end of the second iron core 5B is fixedly connected to the second magnetic yoke 4B, and the second coil 7B is sleeved on the second iron core 5B. In an example, the first coil 7A is wound around a first frame 6A, and the first frame 6A is sleeved on the first iron core 5A. The second coil 7B is wound around a second frame 6B. It should be noted that the assembly means of the two iron cores on their respective adaptive magnetic yokes include but are not limited to the following connection means: directly connecting to the fixed magnetic yoke by an interference fit, connecting to the fixed magnetic yoke through a screw, and connecting to the fixed magnetic yoke through a snap spring.

The first electromagnetic clutch can be a monostable or bistable electromagnetic clutch, and the second electromagnetic clutch can be a monostable or bistable electromagnetic clutch. The difference between the monostable electromagnetic clutch and the bistable electromagnetic clutch is that the monostable electromagnetic clutch engages when energized, and disengages when de-energized; the bistable electromagnetic clutch is engaged or disengaged a brief pulse current is applied, and the engagement and disengagement states can be kept without energizing or any form of energy consumption. Therefore, the bistable electromagnetic clutch is more energy-efficient than the monostable electromagnetic clutch.

When the first and second electromagnetic clutches are monostable clutches, the first electromagnetic movable unit comprises a first movable disc 2A, the first movable disc 2A has a first sinking hole 2E corresponding to the position of the first iron core 5A, and there is an air gap 2G between the first sinking hole 2E and the end face of the first iron core 5A; the second electromagnetic movable unit comprises a second movable disc 2B, the second movable disc 2B has a second sinking hole 2F_corresponding to the position of the second iron core 5B, and there is an air gap 2G between the second sinking hole 2F and the end face of the second iron core 5B.

When the first and second electromagnetic clutches are bistable clutches, the first electromagnetic movable unit further comprises a first magnetic conduction disc 1A and a first magnet 3A. The first magnet 3A is installed in the first sinking hole 2E, and the first magnetic conduction disc 1A is installed on the end face of the first movable disc 2A and in contact with the first magnet 3A; the second electromagnetic movable unit further comprises a second magnetic conduction disc 1B and a second magnet 3B. The second magnet 3B is installed in the second sinking hole 2F, and the second magnetic conduction disc 1B is installed on the end face of the second movable disc 2B and in contact with the second magnet 3B. Optionally, the material of the first and second magnets is magnetic steel. The magnetic conduction discs play a role in conducting magnetic circuits.

In some embodiments, the first position-limiting unit comprises a first position-limiting block and a first position-limiting plate. The first position-limiting block is installed on the first magnetic yoke 4A and connected to the first elastic member, and is used to limit the position of the first electromagnetic movable unit when it engages. The first position-limiting plate is installed on the outer side of the first movable disc 2A and fixed to the connecting pins 8, and is used to limit the position of the first electromagnetic movable unit when it disengages. The second position-limiting block is installed on the second magnetic yoke 4B and connected to the second elastic member, and is used to limit the position of the second electromagnetic movable unit when it engages. The second position-limiting plate is installed on the outer side of the second moving disc 2B and fixed to the connecting pins 8, and is used to limit the position of the second electromagnetic movable unit when it disengages.

In addition, the bidirectional electromagnetic clutch further comprises a displacement prevention plate 10. The two ends of the displacement prevention plate 10 are respectively provided on the outer side of the first movable disc 2A and the outer side of the second movable disc 2B. The distance between the two ends of the displacement prevention plate 10 is smaller than the distance from the first position-limiting plate to the second position-limiting plate. The function of the displacement prevention plate is to prevent the displacement of electromagnetic movable units on two sides from exceeding a preset distance, which may cause the gear shift mechanism to be misaligned, thereby avoiding structural failure in specific working environments.

According to some embodiments of the present disclosure, the bidirectional electromagnetic clutch is equipped with a position sensor 13 for monitoring the position status of the bidirectional electromagnetic clutch. The position sensor 13 includes but is not limited to the following types of sensors: an inductive position sensor and a Hall position sensor.

A gear shifting device provided according to the second aspect of the present disclosure will be described below in conjunction with the accompanying drawings.

Figure 3:
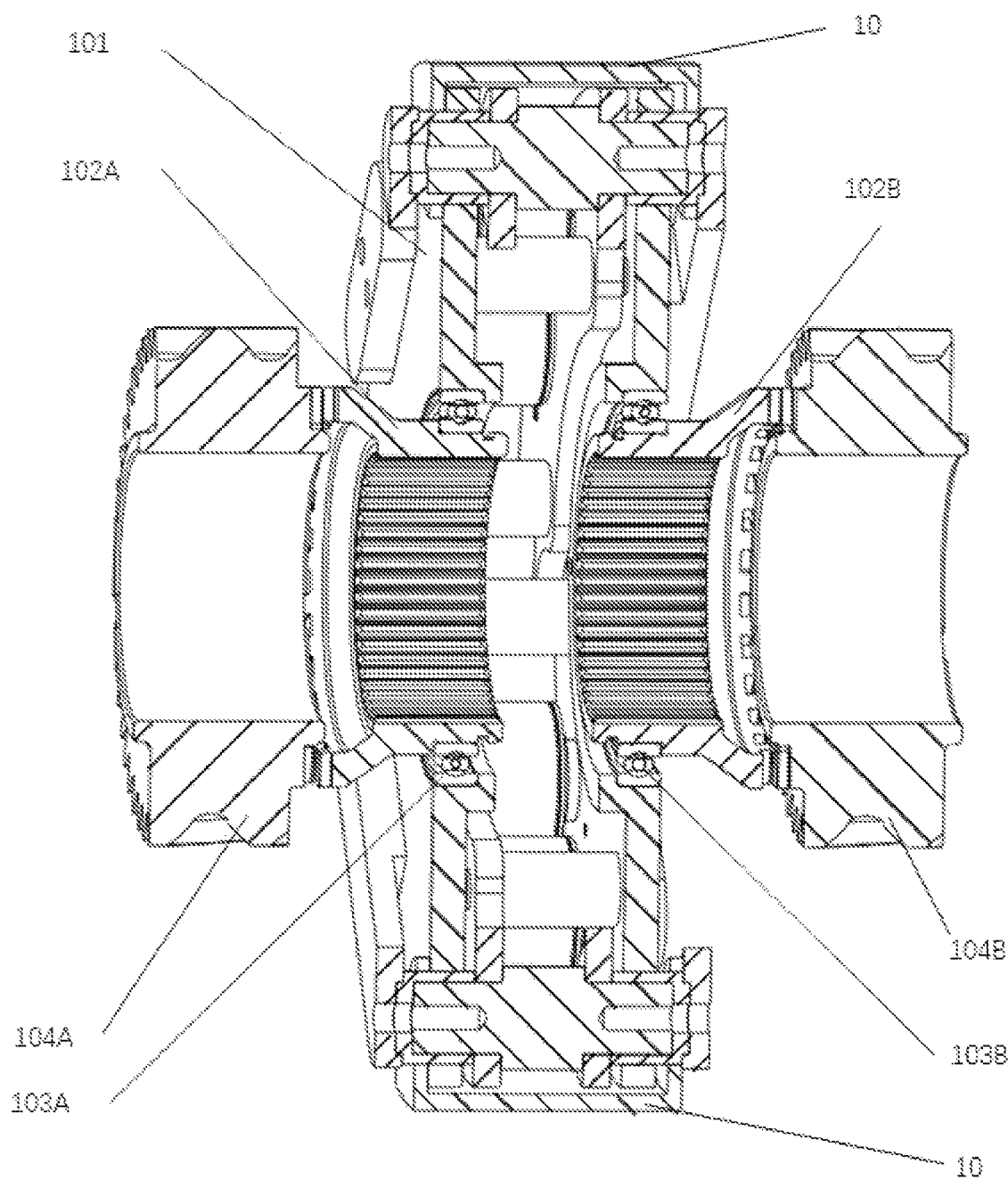
FIG. 3 is a schematic diagram of the structure of a gear shifting device according to an embodiment of the present disclosure.
Figure 4:
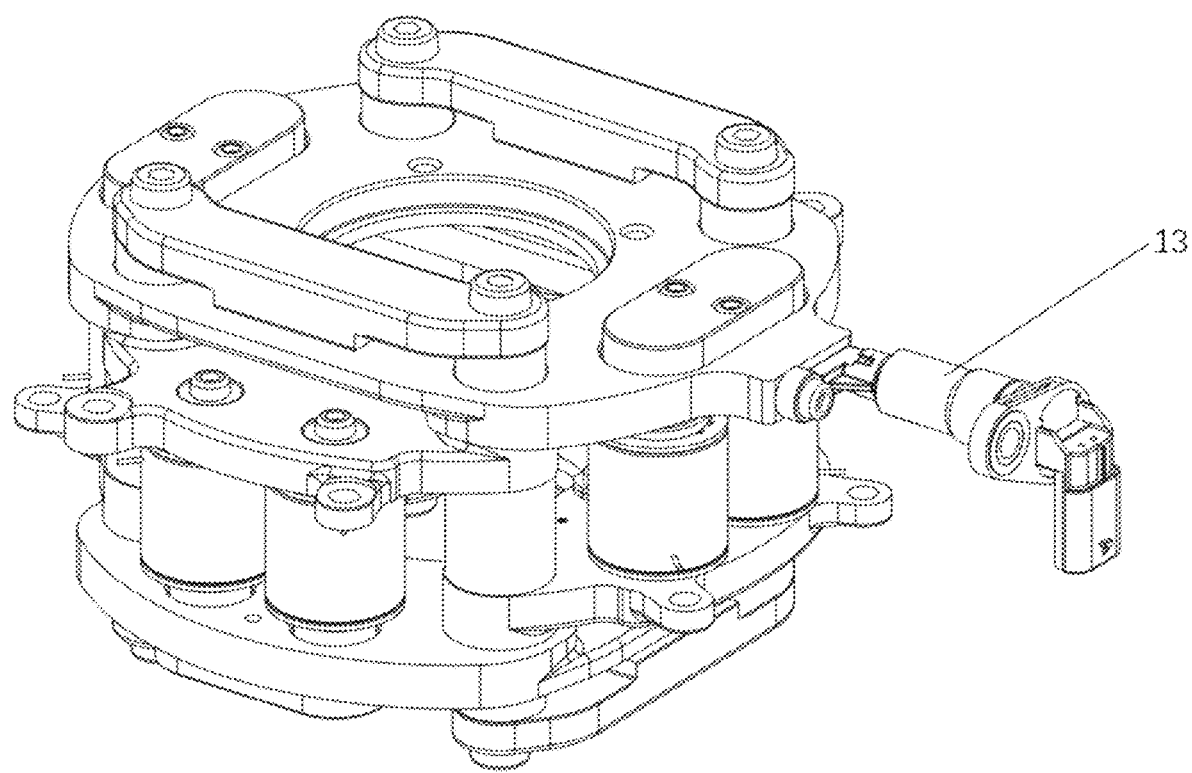
FIG. 4 is a schematic diagram of the structure of a bidirectional electromagnetic according to an embodiment of the present disclosure.
Figure 5:
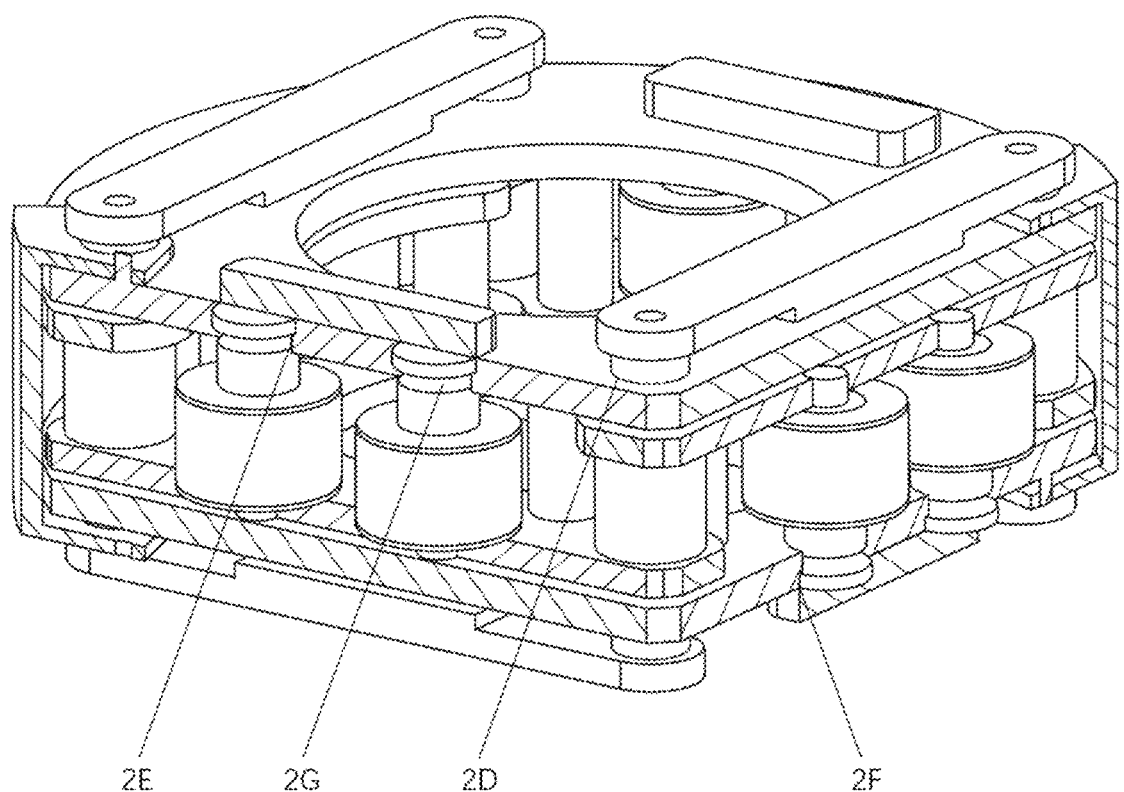
FIG. 5 is a schematic diagram of the structure of a bidirectional electromagnetic according to an embodiment of the present disclosure.
Figure 6:
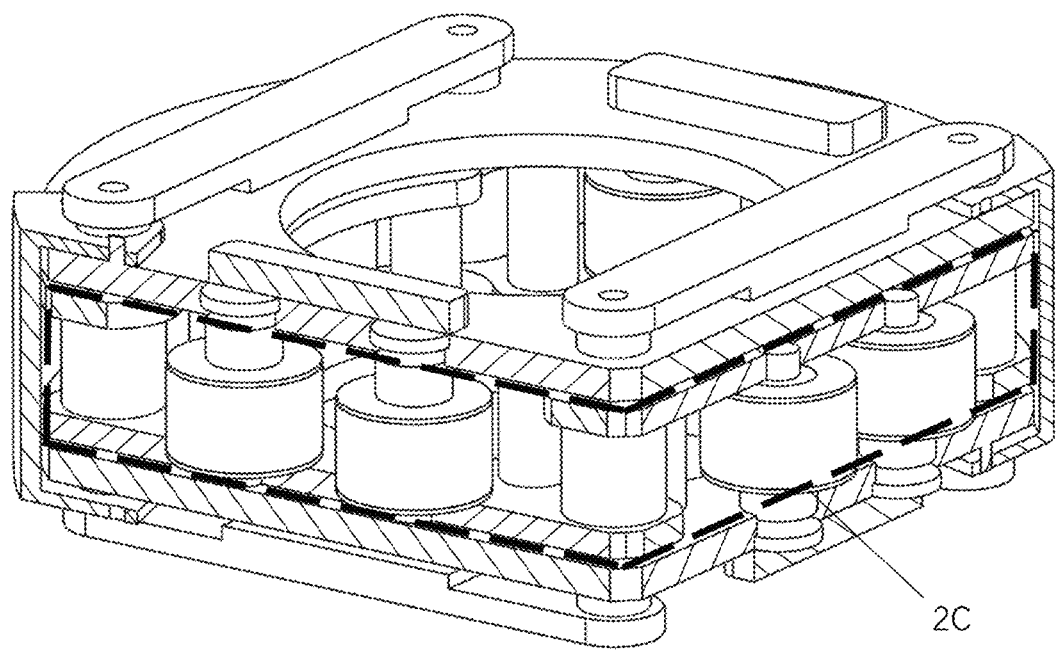
FIG. 6 is a schematic diagram of the structure of a bidirectional electromagnetic according to an embodiment of the present disclosure.

As shown in FIGS. 1 to 3, in this embodiment, the gear shifting device comprises an electromagnetic unit and a mechanical unit coupled together. The electromagnetic unit is the bidirectional electromagnetic clutch 101 described in the first aspect, and is used to perform functions such as clutch and locking. The electromagnetic unit comprises an electromagnetic movable unit and an electromagnetic fixed unit. The mechanical unit is used to transmit mechanical energy such as torque and speed. The mechanical unit comprises: a first movable end face teeth 102A and a first driving gear 104A that are located on a left side of the gear shifting device, and a second movable end face teeth 102B and a second driving gear 104B that are located on a right side of the gear shifting device. The first movable end face teeth 102A and the first driving gear 104A can be engaged and disengaged, and similarly, the second movable end face teeth 102B and the second driving gear 104B can also be engaged and disengaged. The bidirectional electromagnetic clutch 101 comprises four electromagnetic fixed units arranged in a staggered manner, which are positioned and fixed relative to each other through position-limiting connecting pins 8. In this embodiment, the elastic member 12 is a compression spring and is placed in the position-limiting block 11.

The workflow of the gear shifting device in this embodiment is as follows. When the first electromagnetic fixed unit is energized with a forward current, the corresponding first electromagnetic movable unit is subjected to an electromagnetic force, moves toward the first electromagnetic fixed unit along the axial direction, and stops moving when it comes into contact with the position-limiting block 11. At this point, the first electromagnetic clutch is in an engaged state, and the working state of the second electromagnetic clutch is not affected. When the first electromagnetic clutch is de-energized, the first electromagnetic movable unit remains engaged under the magnetic force of the magnetic steel. When a backward current is applied to the first electromagnetic clutch, the magnetic force provided by the magnetic steel weakens. Under the elastic force of the elastic member 12, the first electromagnetic movable unit moves away from the first electromagnetic fixed unit along the axial direction, and stops moving when it comes into contact with the position-limiting plate 9. At this point, the first electromagnetic movable unit is in a disengaged state, and the working state of the second electromagnetic clutch is not affected.

When the second electromagnetic fixed unit is energized with a forward current, the corresponding second electromagnetic movable unit is subjected to an electromagnetic force, moves toward the second electromagnetic fixed unit along the axial direction, and stops moving when it comes into contact with the position-limiting block 11. At this point, the second electromagnetic clutch is in an engaged state, and the working state of the first electromagnetic clutch is not affected. When the second electromagnetic fixed unit is de-energized, the second electromagnetic movable unit remains engaged under the magnetic force of the magnetic steel. When the second electromagnetic fixed unit is energized with a backward current, the magnetic force provided by the magnetic steel weakens. Under the elastic force of the elastic member 12, the second electromagnetic movable unit moves away from the second electromagnetic fixed unit along the axial direction, and stops moving when it comes into contact with the position-limiting plate 9. At this point, the second electromagnetic clutch is in a disengaged state, and the working state of the first electromagnetic clutch is not affected. Due to the requirement of functions, the first and second electromagnetic movable units of the bidirectional electromagnetic clutch in this embodiment cannot be in a disengaged state at the same time. Therefore, the height of the displacement prevention plate 10 is equal to the distance when the first electromagnetic movable unit disengages and the second electromagnetic movable unit engages. When the first electromagnetic movable unit disengages, if the second electromagnetic movable unit will also disengage, it will be limited by the displacement prevention plate 10 and the action cannot be completed, and vise versa, thereby ensuring that the electromagnetic movable units on two sides are not in a disengaged state at the same time.

In this embodiment, the function of the elastic member 12 needs to meet the following two requirements. First, when the first electromagnetic movable unit or the second electromagnetic movable unit is in a disengaged state and the first electromagnetic clutch fixed unit or the second electromagnetic fixed unit is not energized, the elastic member 12 can keep the first electromagnetic movable unit or the second electromagnetic movable unit in a disengaged state. Second, when the first electromagnetic movable unit or the second electromagnetic movable unit is in an engaged state, if the first electromagnetic clutch fixed unit or the second electromagnetic fixed unit is energized with a backward current, the elastic member 12 can move the first electromagnetic movable unit or the second electromagnetic movable unit to a disengaged state.

As shown in FIG. 3, in this embodiment, transmitting power by the left gear is set to be a first gear, transmitting power by the right gear is set to be a second gear, and transmitting no power by any side gear is set to be neutral. To make the working states of electromagnetic and mechanical unit clearer, Table 1 shows the working states of electromagnetic and mechanical unit one by one.

TABLE 1

| | shift device | | | |
|---|---|---|---|---|
| | left side of shift device | | right side of shift device | |
| gear | electromagnetic unit | mechanical unit | electromagnetic unit | mechanical unit |
| first gear | disengaged | engaged | engaged | disengaged |
| second gear | engaged | disengaged | disengaged | engaged |
| neutral | engaged | disengaged | engaged | disengaged |

In this embodiment, the movable end face teeth 102 and the bidirectional electromagnetic clutch 101 are assembled together through a deep groove ball bearing 103, so that the movable end face teeth 102 can follow the movable unit of the bidirectional electromagnetic clutch 101 to move along the axial direction.

In this embodiment, the deep groove ball bearing 103 is installed on the movable unit of the bidirectional electromagnetic clutch 101 by an interference fit; the movable end face teeth 102 and the deep groove ball bearings 103 are assembled by an interference fit connection. The above is just an example in this embodiment. In practical applications, the parts that can be used as connection support between the movable end face teeth 102 and the bidirectional electromagnetic clutch 101 include but are not limited to the following parts with relative rotation function: thrust bearings, cylindrical roller bearings, sliding bearings, etc. The connection means between the rotating parts and the movable units of the bidirectional electromagnetic clutch 101 include but are not limited to: direct assembly by an interference fit, installation through a cover plate and screws, installation through gaskets and screws, etc.

In this embodiment, the first movable end face teeth 102A and the second movable end face teeth 102B are respectively connected to the transmission shaft through splines. The first driving gear 104A and the second driving gear 104B are supported on the transmission shaft through needle roller bearings.

The gear shifting device has a total of four working states. In this embodiment, due to the installation of the displacement prevention plate 10, the working state that the first electromagnetic clutch and the second electromagnetic clutch are both disengaged cannot be achieved. Therefore, the gear shifting device in this embodiment has three transmission modes. First, when the first electromagnetic clutch is disengaged and the second electromagnetic clutch is engaged, the first movable end face teeth 102A engages with the end face teeth on the first driving gear 104A, and the second movable end face teeth 102B disengages from the end face teeth on the second driving gear 104B. At this point, the first driving gear 104A transmits power, while the second driving gear 104B does not transmit power. Second, when the first electromagnetic clutch is engaged and the second electromagnetic clutch is disengaged, the first movable end face teeth 102A disengages from the end face teeth on the first driving gear 104A, and the second movable end face teeth 102B engages with the end face teeth on the second driving gear 104B. At this point, the first driving gear 104A does not transmit power, and the second driving gear 104B transmits power. Third, when the first electromagnetic clutch is engaged and the second electromagnetic clutch is engaged, the first movable end face teeth 102A disengages from the end face teeth on the first driving gear 104A, and the second movable end face teeth 102B disengages from the end face teeth on the second driving gear 104B. At this point, neither the first driving gear 104A nor the second driving gear 104B transmits power, and the gear shifting device is in neutral position.

It should be noted that in the description of the present disclosure, the terms "first", "second", etc. are only used for descriptive purposes and should not be understood as indicating or implying relative importance. Furthermore, in the description of the present disclosure, unless otherwise specified, "multiple" or "a plurality of" means two or more.

In the present disclosure, unless otherwise specified and defined, the terms such as "installation", "connection", "fixation" should be understood in a broad sense, for example, it may be fixedly connected, or removably connected, or integrally connected; it may also be mechanically connected, electrically connected, or telecommunicated with each other; it may be directly connected or indirectly connected through a middleware; it may also be internally communicated or interacted between two components. For a person of ordinary skill in the art, the specific meaning of these terms in the present disclosure should be understood according to specific situations.

In the present disclosure, unless otherwise specified and defined, the first feature being located "on" or "beneath" the second feature may be that the first and second features are in direct contact or in indirect contact through an intermediate medium. Moreover, the first feature being "above" the second feature may be that the first feature is directly or diagonally above the second feature, or only indicate that the horizontal height of the first feature is higher than that of the second feature. The first feature being "below" or "under" the second feature may be that the first feature is directly or diagonally below the second feature, or only indicate that the horizontal height of the first feature is less than that of the second feature.

In the description of the present disclosure, the terms "left", "right", "front", "back", etc. indicate the orientation or position relationship based on the orientation or position relationship shown in the drawings, only for the convenience of describing the present disclosure and simplifying the description, and not to indicate or imply that the device or element referred to must have a specific orientation, be constructed and operated in a specific orientation, and therefore cannot be understood as a limitation of the present disclosure.

The description of any process or method in a flowchart or otherwise described herein may be understood as comprising one or more modules, fragments, or portions of codes of executable instructions for implementing specific logical functions or procedures, and the scope of preferred embodiments of the present disclosure comprises other implementations, which may not be in the order shown or discussed, including performing functions in a fundamentally simultaneous manner or in reverse order based on the functions involved. This should be understood by those skilled in the art.

In the description of this specification, terms such as "an embodiment", "some embodiments", "an example", "a specific example", or "some examples" means that the specific features, structures, materials, or features described in conjunction with the embodiments or examples are included in at least one embodiment or example of the present disclosure. In this specification, the illustrative description of the above terms may not necessarily refer to the same embodiment or example. Moreover, the specific features, structures, materials, or features described can be combined in an appropriate manner in any one or more embodiments or examples.

Although embodiments of the present disclosure have been shown and described above, it can be understood that the above embodiments are exemplary and cannot be understood as a limitation of the present disclosure. A person of ordinary skill in the art may make changes, modifications, substitutions, and variations to the above embodiments within the scope of the present disclosure.

What is claimed is:

1. A bidirectional electromagnetic clutch comprising:
   a first electromagnetic clutch and a second electromagnetic clutch arranged along positive and negative directions of a same axis, the two electromagnetic clutches being integrated in a same space and configured to independently engage and/or disengage at different ends of the bidirectional electromagnetic clutch;
   wherein the bidirectional electromagnetic clutch has four working states that include:
      the first electromagnetic clutch is engaged and the second electromagnetic clutch is engaged;
      the first electromagnetic clutch is engaged and the second electromagnetic clutch is disengaged;
      the first electromagnetic clutch is disengaged and the second electromagnetic clutch is engaged; and
      the first electromagnetic clutch is disengaged and the second electromagnetic clutch is disengaged, wherein
      the first electromagnetic clutch comprises a first electromagnetic movable unit and a first electromagnetic fixed unit,
      the second electromagnetic clutch comprises a second electromagnetic movable unit and a second electromagnetic fixed unit,
      the first electromagnetic fixed unit and the second electromagnetic fixed unit are arranged along a circumference of the bidirectional electromagnetic clutch,
      the first electromagnetic movable unit and the second electromagnetic movable unit are arranged to face to each other with a partition layer formed therebetween, and
      the first electromagnetic fixed unit and the second electromagnetic fixed unit are arranged in a staggered manner within the partition layer,
   wherein the first electromagnetic clutch is a monostable or bistable electromagnetic clutch, and the second electromagnetic clutch is a monostable or bistable electromagnetic clutch, and
   wherein a plurality of guide holes are provided on the first electromagnetic movable unit and the second electromagnetic movable unit, a plurality of connecting pins are provided between the first electromagnetic movable unit and the second electromagnetic movable unit, and the guide holes and the connecting pins form axial relative movement.

2. The bidirectional electromagnetic clutch according to claim 1, wherein:
   the first electromagnetic fixed unit comprises a first coil unit, a first elastic member, and a first position-limiting unit;
   the second electromagnetic fixed unit comprises a second coil unit, a second elastic member, and a second position-limiting unit;
   the first coil unit and the second coil unit are separated by the connecting pins,
   the first elastic member is connected to the first electromagnetic movable unit,
   the second elastic member is connected to the second electromagnetic movable unit,
   the first position-limiting unit is configured to limit a position of the first electromagnetic movable unit, and
   the second position-limiting unit is configured to limit a position of the second electromagnetic movable unit.

3. The bidirectional electromagnetic clutch according to claim 2, wherein the first coil unit comprises a first coil, a first iron core, and a first magnetic yoke, one end of the first iron core is fixedly connected to the first magnetic yoke, and the first coil is sleeved on the first iron core; the second coil unit comprises a second coil, a second iron core, and a second magnetic yoke, one end of the second iron core is fixedly connected to the second magnetic yoke, and the second coil is sleeved onto the second iron core.

4. The bidirectional electromagnetic clutch according to claim 3, further comprising:
   a means of fixed connection between the first iron core and the first magnetic yoke includes the first iron core and the first magnetic yoke that are connected by an interference fit, or connected through a screw, or connected through a snap spring; and
   a means of fixed connection between one end of the second iron core and the second magnetic yoke includes the second iron core and the second magnetic yoke that are connected by an interference fit, or connected through a screw, or connected through a snap spring.

5. The bidirectional electromagnetic clutch according to claim 3, wherein:
when the first and second electromagnetic clutches are monostable clutches, the first or second electromagnetic clutch is energized for engagement and de-energized for disengagement;
the first electromagnetic movable unit comprises a first movable disc, the first movable disc has a first sinking hole corresponding to a position of the first iron core, and an air gap is disposed between the first sinking hole and an end face of the first iron core;
the second electromagnetic movable unit comprises a second movable disc, the second movable disc has a second sinking hole corresponding to the position of the second iron core, and an air gap is disposed between the second sinking hole and an end face of the second iron core.

6. The bidirectional electromagnetic clutch according to claim 5, wherein:
when the first and second electromagnetic clutches are bistable clutches, the first or second electromagnetic clutch is applied with a pulse current for engagement or disengagement, and during the engagement or disengagement state, the first and second electromagnetic clutches does not need to be energized or consume any form of energy;
the first electromagnetic movable unit further comprises a first magnetic conduction disc and a first magnet, the first magnet is installed in the first sinking hole, and the first magnetic conduction disc is installed on an end face of the first movable disc and in contact with the first magnet; and
the second electromagnetic movable unit further comprises a second magnetic conduction disc and a second magnet, the second magnet is installed in the second sinking hole, and the second magnetic conduction disc is installed on the end face of the second movable disc and in contact with the second magnet.

7. The bidirectional electromagnetic clutch according to claim 6, wherein:
the first position-limiting unit comprises a first position-limiting block and a first position-limiting plate, the first position-limiting block is installed on the first magnetic yoke and connected to the first elastic member, and is configured to limit a position of the first electromagnetic movable unit when it engages;
the first position-limiting plate is installed on an outer side of the first movable disc and fixed to the connecting pins, and is configured to limit a position of the first electromagnetic movable unit when it disengages;
the second position-limiting block is installed on the second magnetic yoke and connected to the second elastic member, and is configured to limit a position of the second electromagnetic movable unit when it engages; and
a second position-limiting plate is installed on an outer side of the second movable disc and fixed to the connecting pins, and is configured to limit a position of the second electromagnetic movable unit when it disengages.

8. The bidirectional electromagnetic clutch according to claim 6, further comprising a displacement prevention plate, two ends of the displacement prevention plate are respectively provided on an outer side of the first movable disc and an outer side of the second movable disc, a distance between two ends of the displacement prevention plate is less than a distance from the first position-limiting plate to the second position-limiting plate, and the displacement prevention plate is configured to prevent movement of the first movable disc and/or the second movable disc from exceeding a preset distance.

9. The bidirectional electromagnetic clutch according to claim 1, further comprising a position sensor for monitoring position status of the bidirectional electromagnetic clutch, the position sensor being an inductive position sensor or a Hall position sensor.

10. A gear shifting device comprising a mechanical unit and the bidirectional electromagnetic clutch according to claim 9, wherein the mechanical unit is coupled with the bidirectional electromagnetic clutch that is configured to perform clutch and locking, and the mechanical unit is configured to transmit mechanical energy.

11. A gear shifting device comprising a mechanical unit and the bidirectional electromagnetic clutch according to claim 1, wherein the mechanical unit is coupled with the bidirectional electromagnetic clutch that is configured to perform clutch and locking, and the mechanical unit is configured to transmit mechanical energy.

* * * * *